(12) United States Patent
Bingham et al.

(10) Patent No.: US 8,074,509 B2
(45) Date of Patent: Dec. 13, 2011

(54) WELLBORE MONITOR

(75) Inventors: Richard Bingham, Katy, TX (US); Gordon M. Logan, Aberdeen (GB); Jan Thore Eia, Kvernaland (NO)

(73) Assignee: M-I LLC, Houston, TX (US)

( * ) Notice: Subject to any disclaimer, the term of this patent is extended or adjusted under 35 U.S.C. 154(b) by 642 days.

(21) Appl. No.: 12/032,516

(22) Filed: Feb. 15, 2008

(65) Prior Publication Data
US 2008/0196942 A1  Aug. 21, 2008

Related U.S. Application Data

(60) Provisional application No. 60/890,879, filed on Feb. 21, 2007.

(51) Int. Cl.
*E21B 47/00* (2006.01)
(52) U.S. Cl. .................................... 73/152.18
(58) Field of Classification Search ............. 175/66; 73/152.18, 152.21
See application file for complete search history.

(56) References Cited

U.S. PATENT DOCUMENTS

| | | | | |
|---|---|---|---|---|
| 4,412,130 A | * | 10/1983 | Winters | 250/260 |
| 4,615,870 A | * | 10/1986 | Armstrong et al. | 422/191 |
| 5,413,154 A | * | 5/1995 | Hurst et al. | 141/83 |
| 6,009,959 A | | 1/2000 | Dietzen | 175/66 |
| 6,213,227 B1 | | 4/2001 | Dietzen | 175/66 |
| 6,357,536 B1 | * | 3/2002 | Schrader et al. | 175/48 |
| 6,410,862 B1 | | 6/2002 | Lecann et al. | 177/17 |
| 6,709,216 B2 | | 3/2004 | Snowdon et al. | 414/137.1 |
| 7,033,124 B2 | | 4/2006 | Snowdon et al. | 414/137.1 |
| 2004/0007142 A1 | * | 1/2004 | Jollez et al. | 100/337 |
| 2005/0092523 A1 | * | 5/2005 | McCaskill et al. | 175/38 |
| 2005/0183574 A1 | * | 8/2005 | Burnett et al. | 95/271 |
| 2005/0263541 A1 | * | 12/2005 | Hoff et al. | 222/1 |
| 2006/0102390 A1 | | 5/2006 | Burnett et al. | 175/66 |

OTHER PUBLICATIONS

PCT International Search Report issued in PCT Application No. PCT/US2008/054250 dated Jul. 29, 2008 (4 pages).
PCT Written Opinion issued in PCT Application No. PCT/US2008/054250 dated Jul. 29, 2008 (4 pages).
Examiner's Report issued in corresponding Canadian patent application No. 2,678,511; Dated Sep. 16, 2010 (3 pages).
Examiner's Report issued in corresponding Canadian Patent Application No. 2,678,511; Dated Jul. 15, 2011 (2 pages).

* cited by examiner

*Primary Examiner* — Hezron E Williams
*Assistant Examiner* — Tamiko D Bellamy
(74) *Attorney, Agent, or Firm* — Osha Liang LLP

(57) ABSTRACT

A system for determining produced drill solids volume including a receiving vessel for receiving drill solids and a pressure vessel coupled to the receiving vessel. The receiving vessel has an isolation valve system to control the flow of drill solids between the receiving vessel and the pressure vessel, and the pressure vessel is adapted to allow a compressed gas to convey drill solids from the pressure vessel to a discharge line. The system also includes a skid having a plurality of weight sensors for weighing the drill solids in the pressure vessel, wherein the pressure vessel is disposed on the plurality of weight sensors and a programmable logic controller operatively couples to at least the plurality of weight sensors for calculating the weight of the drill solids in the pressure vessel.

22 Claims, 4 Drawing Sheets

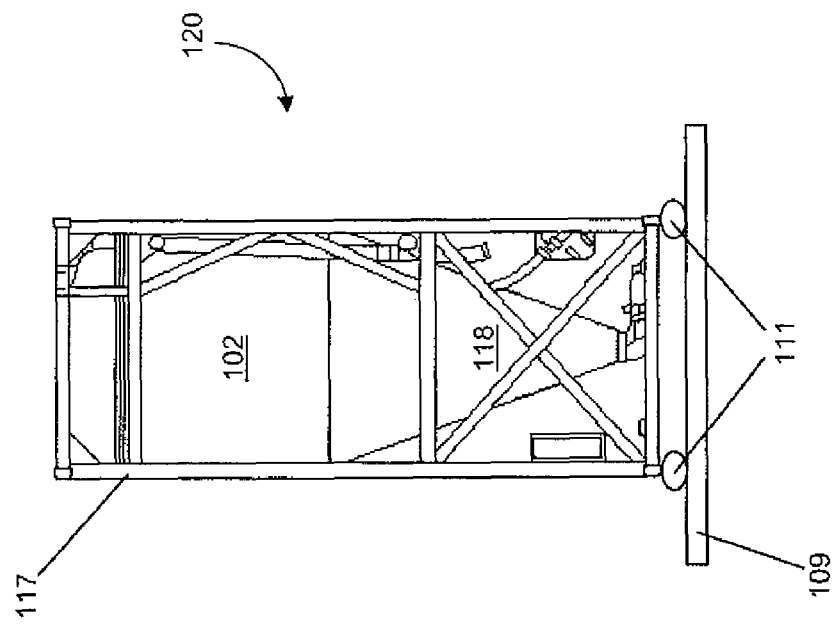
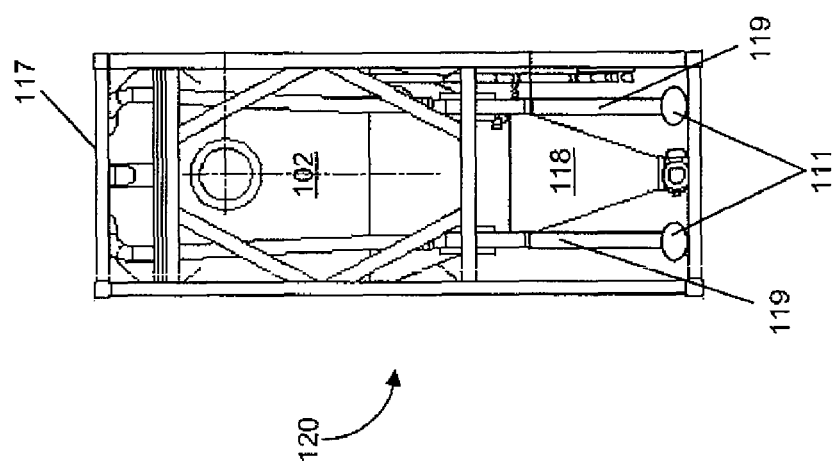
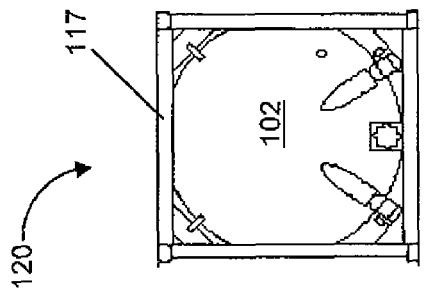
Figure 1D
Figure 1C
Figure 1B

WELLBORE MONITOR

CROSS-REFERENCE TO RELATED APPLICATIONS

This application, pursuant to 35 U.S.C. §119(e), claims priority to U.S. Provisional Application Ser. No. 60/890,879, filed Feb. 21, 2007. That application is incorporated by reference in its entirety.

BACKGROUND

1. Field of the Disclosure

Embodiments disclosed herein relate generally to methods and systems for the real-time acquisition of data regarding well fluids and drill solids. More specifically, embodiments disclosed herein relate to methods and system for using data acquired during cuttings transference to adjust drilling operation parameters.

2. Background Art

When drilling or completing wells in earth formation, various fluids ("well fluids") are typically used in the well for a variety of reasons. Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stability the formation through which the well is being drilled, fracturing the formation in the vicinity of the well, displacing the fluid within the well with another fluid, cleaning the well, testing the well, emplacing a packer fluid, abandoning the well or preparing the well for abandonment, and otherwise treating the well for the formation.

In a typical drilling operation, well fluids are pumped downhole to lubricate the drill bit and carry away well cuttings generated by the drill bit. The cuttings are carried to the surface in a return flow stream of well fluids through the well annulus and back to the rig or well drilling platform at the earth surface. When the drilling fluid reaches the surface, it is contaminated with small pieces of shale and rock drill cuttings. As the well fluid is returned to the surface, drill cuttings are separated from reusable fluid by commonly known vibratory separators (i.e., shale shakers). Typically, well fluid is cleaned (i.e., the particulate matter is separated from reusable fluids) so that the cuttings may be discarded in accordance with environmental regulations and the drilling fluids may be recycled in the drilling operation. Vibratory separators, one such cleaning method, are designed to filter solid material from the well fluids such that cuttings are removed from the fluid, prior to the fluid being pumped back downhole. Cleaning the cuttings via vibratory separators is only one cleaning process that cuttings may undergo. Certain drilling operations may use additional cleaning processes, such as, for example, use of centrifuges to further remove oil and other well fluids from the cuttings. The cleaning process is generally continuous with drilling of the well. Thus, as long as the well is being drilled, well fluid contaminated with cuttings is returned to the surface.

Presently, cuttings are returned to the surface, and after processing by cleaning equipment, discarded in cuttings boxes, collection bins, or otherwise transferred for downstream remediation processes, such as, for example, thermal desorption. One method of transferring cleaned drill cuttings is via a pneumatic transfer process, such as the processes described in U.S. Pat. No. 6,213,227, assigned to the assignee of the present application, and herein incorporated in its entirely. Such processes use a pneumatic transfer device to collect, isolate, and subsequently transfer cleaned cuttings through pneumatic piping to storage vessels located in close proximity to the transfer device. Other methods for transferring cleaned drill cuttings via pneumatic transfer are disclosed in U.S. Pat. No. 7,033,124, herein incorporated in its entirety.

Currently, pneumatic transference of cuttings allows a drilling operator to efficiently transfer cleaned cuttings from cleaning equipment to a storage location. However, the quantity of cuttings being transferred, and other data associated with returned cuttings and well fluid is not easily measurable. Thus, a drilling operator does not know the volume of cuttings that are being transferred, the rate of return of the cuttings, or specific properties of the cuttings, until they are collected in storage vessels and/or removed from the rig. The delayed acquisition of such data prevents the data from being used in determining downhole conditions and/or operability parameters of the drilling operations, such as, for example, the rate of penetration of a drill bit into the formation.

Instead, such data is only available by imprecise observations of drilling operators and by normalizing drilling programs to determine an expected volume of drill cuttings based on, among other things, a known rate of penetration, a wellbore diameter, and measurable formation properties. However, such acquisition means do not provide real-time data regarding cuttings production that is usable in an operation to adjust drilling parameters or to obtain information about a drilling operation. Thus, the data regarding drill cuttings that is obtained, while informative, has no viable function in the drilling operation.

Accordingly, there exists a continuing need for improvements in the data gathering capabilities of cuttings transfer devices to allows data acquired therefrom to be useable in real-time.

SUMMARY OF THE DISCLOSURE

In one aspect, embodiments disclosed herein relate to a system of determining produced drill solids volume including a receiving vessel for receiving drill solids and a pressure vessel coupled to the receiving vessel. The receiving vessel has an isolation valve system to control the flow of drill solids between the receiving vessel and the pressure vessel, and the pressure vessel is adapted to allow a compressed gas to convey drill solids from the pressure vessel to a discharge line. The system also includes a skid having a plurality of weight sensors for weighing the drill solids in the pressure vessel, wherein the pressure vessel is disposed on the plurality of weight sensors and a programmable logic controller operatively couples to at least the plurality of weight sensors for calculating the weight of the drill solids in the pressure vessel.

In another aspect, embodiments disclosed herein relate to a method of determining produced drill solids volume that includes conveying drill solids to a storage vessel, wherein the storage vessel is disposed on a skid. The skid includes a plurality of weight sensors, wherein the plurality of weight sensors are operatively coupled to a programmable logic controller The method further includes isolating the storage vessel and weighing the storage vessel and the drill solids with the plurality of weight sensors. Additionally, the method includes communicating a measurement of the weight of the storage vessel and the drill solids from the weight sensors to the programmable logic controller, and calculating a volume of drill solids in the storage vessel.

In another aspect, embodiments disclosed herein relate to a method of drilling that includes drilling a wellbore with a drilling fluid and returning the drilling fluid to the surface, wherein the returned drilling fluid is separated into a fluid portion and a solid portion. The method further includes calculating a volume of the solid portion and determining a hole cleaning efficiency based on the calculated volume of the solid portion.

Other aspects and advantages of the disclosure will be apparent from the following description and the appended claims.

BRIEF DESCRIPTION OF DRAWINGS

FIG. 1B shows a top view of a pneumatic transfer device according to one embodiment of the present disclosure.

FIG. 1C shows a side view of a pneumatic transfer device according to one embodiment of the present disclosure.

FIG. 1D shows a side view of a pneumatic transfer device according to one embodiment of the present disclosure.

DETAILED DESCRIPTION

Embodiments disclosed herein relate generally to methods and system for the real-time acquisition of data regarding well fluids and drill solids. More specifically, embodiments disclosed herein relate to methods and system for using data acquired during cuttings transference to adjust drilling operation parameters. The term drill solids, as used herein, may refer to drill cuttings, additives, or other material entrained within a fluid communicated from a wellbore. Thus, embodiments of the present disclosure may be used in, for example, drilling, completion, production, and post-production operations.

Figure 1A:
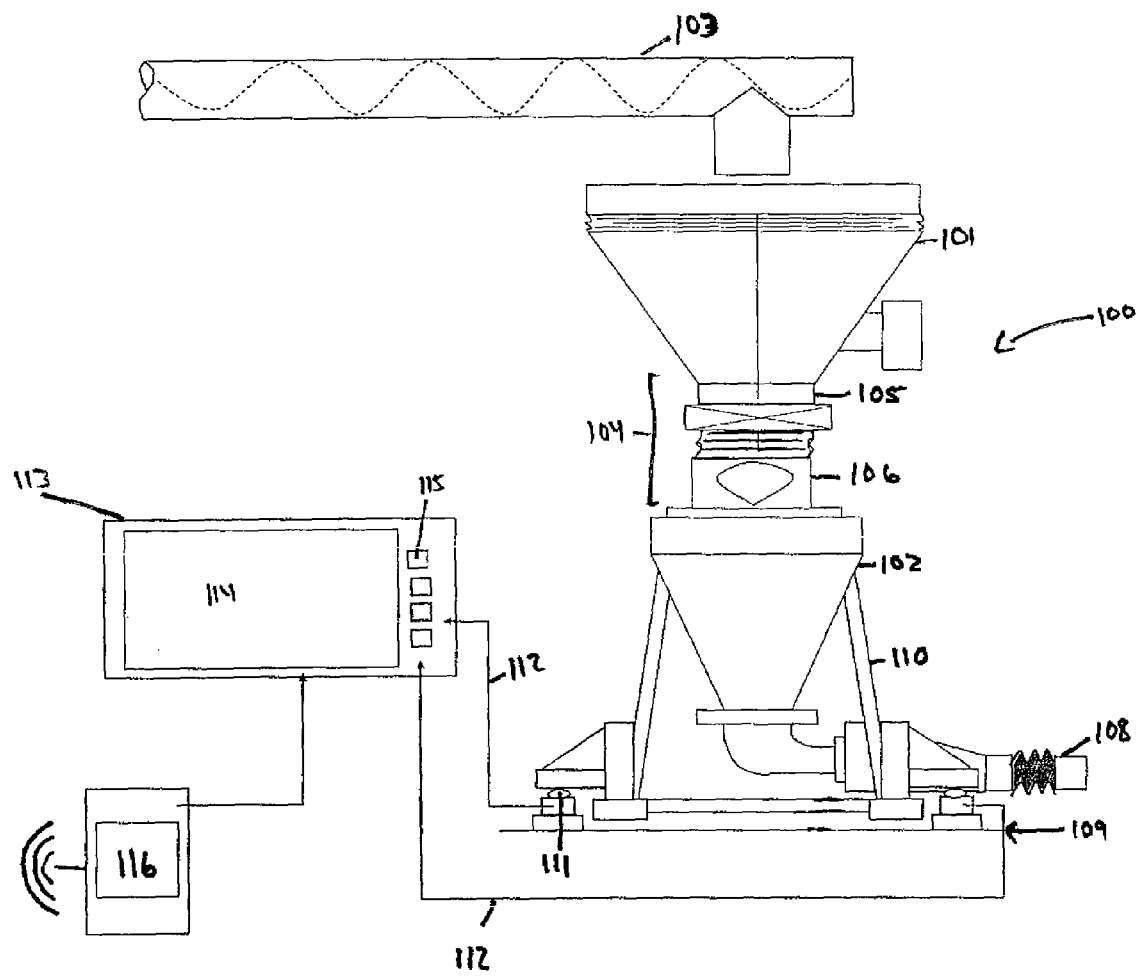
FIG. 1A shows a schematic of a system according to one embodiment of the present disclosure.

Referring to FIG. 1A, a schematic of a system according one embodiment of the present disclosure is shown. In this embodiment, a pneumatic transfer device 100 includes a receiving vessel 101 coupled to a pressure vessel 102. Receiving vessel 100 is generally illustrated as a conical tank whereby drill solids may be introduced thereto via a drill solids conveyor 103. Examples of systems using receiving vessels and pressure vessels are described in U.S. Pat. No. 7,033,124, previously incorporated. However, those of ordinary skill in the art will realize that receiving and pressure vessels of different geometries are still within the scope of the present disclosure. Preferably, to promote pneumatic transfer of drill solids from pressure vessel 102, the lower portion of the vessel will have an angled portion. However, those of ordinary skill in the art will appreciate that different degrees of inclination of the vessels are within the scope of the present disclosure, and as such, the embodiments described herein are merely exemplary of pneumatic transfer devices in general. Drill solids conveyor 103 is connected to shakers or other upstream cleaning equipment used to separate well fluids from solids. Drill solids conveyor 103 may include piping, troughs, or conveyor belt systems, as well as valves and actuation members to control the flow of solids into receiving vessel 101 as are known to those of ordinary skill in the art.

The coupling of receiving vessel 101 to pressure vessel 102, as illustrated, includes an isolation valve system 104. The isolation valve system 104 includes a first valve 105 that controls the flow of drill solids from receiving vessel 101 into pressure vessel 102. Thus, as first valve 105 is actuated, drill solids will be prevented from flowing into pressure vessel 102. Isolation valve system 104 also includes a second valve 106 that is used to pressurize pressure vessel 102 prior to the pneumatic transference of the drill solids therefrom. Between first valve 105 and second valve 106, spacing is provided that prevents the weight of drill solids in receiving vessel 102 from imparting a weight to pressure vessel 102. Thus, when both first valve 105 and second valve 106 are actuated, the contents of pressure vessel 102 are isolated from the contents of receiving vessel 101.

Pressure vessel 102 is also coupled to a discharge line 108. Discharge line 108 may include multiple flexible tubes or piping sections that allow drill solids to be transferred from pneumatic transfer device 100 to storage vessels (not illustrated) located proximate the drilling operation. Suitable storage vessels that may be used include, for example, cutting boxes and standard 20 foot ISO containers.

Generally, pneumatic transfer device 100 is disposed on a skid 109. Skid 109 includes support structure 110 that supports, for example, receiving vessel 101 and pressure vessel 102. One of ordinary skill in the art will appreciate that individual support members may support separate sections of pneumatic transfer device 100 independently. Thus, receiving vessel 101 may be supported independent from pressure vessel 102. Upon actuation of first and second valves 105 and 106, such independent support may allow the weight of drill solids in pressure vessel 102 to be isolated from the weight of drill solids in receiving vessel 101.

Pressure vessel 102 may be disposed on a plurality of weight sensors 111 located between pressure vessel 102 and skid 109. Weight sensors 111 may include any type of sensor used to measure weight, including, but not limited to strain gauges, tension load cells, compression load cells, strain gauge load cells, and/or universal measurement load cells. In certain embodiments, the load cells my include, for example, bending beam cells, shear beam cells, canister cells, ring and pancake cells, button and washer cells, or other non-strain gauge based load cells, including, mechanical load cells, helical load cells, and/or fiber optic load cells. In this embodiment, weight sensors 111 are illustrated as load cells, and are disposed such that upon actuation of first and second valves 105 and 106 the weight of pressure vessel 102 and the drill solids contained therein may be measured. The measured weight or data containing the measured weight is then transferred via data lines 112 to a programmable logic controller ("PLC") 113. In alternate embodiments, data from weight sensors 111 may be transferred to PLC 113 via wireless communication equipment as is known to those of ordinary skill in the art.

PLC 113 may include a number of input and output means, display devices, and communication/calculation packages. In one embodiment, PLC 113 includes a display unit 114 for displaying the results of data calculated from at least weight sensors 111, an input device 115 for receiving external data (e.g., well fluid densities and results of a retort analysis) from a drilling operator, and a receiving input (not independently shown) for receiving data from weight sensors 111. Display unit 114 may include a graphical user interface ("GUI") rendered by instructions provided from the PLC or an associated computer. Furthermore, input device 115 and display unit 114 may interface directly such that data may be input to PLC 113 via, for example, a touch screen or another input type as known to those of ordinary skill in the art.

In this embodiment, PLC 113 operatively interfaces with a communication package 116. Communication package 116 may connect PLC 113 or another component of pneumatic transfer device 100 to a secondary computer system and/or provide remote access to an output signal of PLC 113. For example, one communication package 116 may include a wireless communication system (not shown) that may allow PLC 113 to interface with a drilling rig computer network such that information about downhole conditions may be transferred therebetween. In other embodiments, communication package 116 may allow for remote access and input/output of drilling parameters used in calculating cutting volume, such as, for example, well fluid densities, rate of penetration, lithology information, and formation data. Thus, in one embodiment, as PLC 113 calculates the volume of cuttings passing though pneumatic transfer device 100, a remotely located operator may use the data to determine downhole drilling conditions. Because access and transference of such data occurs quickly, the data may be acquired in virtual real-time, thereby allowing a drilling operator to change aspects of the drilling operation to provide for more efficient drilling. Examples of a change a drilling operator may make to the drilling operation may include adjustments to the weight on bit, revolutions per minute, and well fluid properties.

Such calculated data may be displayed in graphical, numerical, and/or comparative form. In one embodiment, PLC 113 may display drilling parameters and a comparison of drill solids volume calculated versus a calculated drill solids volume expected. Such comparative data outputs may allow a drilling operator to determine downhole conditions, such as, conditions effecting the formation of filter cake, the likelihood of stick-slip conditions, and the efficiency of cuttings removal. Because a drilling operator will have access to comparative conditions relative to a segment of a drilling operation, the drilling operator will be able to discern when downhole conditions change so as to necessitate a change to associated drilling parameters. Thus, in one embodiment, a drilling operator will have real-time or near real-time access to the volume of drill solids returned to the surface, and will be able to adjust drilling parameters accordingly. One of ordinary skill in the art will appreciate that data collected from load cells 111 may be used to calculate more than just a volume of drill solids removed from a drilling operation. As such, the following illustrated embodiments are merely exemplary of how such a system as described above may be used.

In certain embodiments, PLC 113 may also control the measurement cycles of drill solids in pressure vessel 102. For example, in one embodiment, PLC 113 may be instructed to obtain measurements from weight sensors 111 at predetermined time increments. The time increments may be determined independent of, or in concert with a calculated rate of penetration provided via communication package 116 or input device 115. In such an embodiment, data interpreted by PLC 113 may be conditioned, and the output adjusted, based on the time increment measurement cycle. Such a system may promote the real-time approximation of the data, because the system would not wait to be filled prior to making a measurement. By receiving data in regular increments, a drilling operator may readily adjust drilling parameters according to the data.

In another embodiment, pneumatic transfer device 100 may self-regulate to take a weight measurement when pneumatic transfer device 100 fills to a specified level. Determination of such a level may be achieved by, for example, providing sensors (e.g., capacitance or optical sensors) on the interior of pressure vessel 102 for measuring the fill level of the vessel. Such an embodiment may decrease the number of measurement cycles, thereby increasing the transfer efficiency of the system. However, in such an embodiment, less data may be collected, and thus the real-time approximation of the system may be decreased.

In still another embodiment, weight sensors 111 may continuously transmit weight data to PLC 113, and then when a predetermined weight or time interval is reached, PLC 113 may initiate an emptying cycle, thereby discharging the drill solid from pressure vessel 102. Such a continuous measurement system may allow a drilling operator to evaluate the collection of drill solids in real-time or near real-time.

Depending on the type of measurement cycle, different display options may be optimal. For example, in incremental and time sensitive cycling, a drilling operator may benefit from graphical displays of the weight of drill solids cumulatively indexed as a function of time. In such displays, a drilling operator would be able to examine the measured net volume of drill solids removed from the wellbore compared numerically and graphically against a predicted volume of drill solids removed. Such a predictive model is known in the art, and may be as straight forward as a calculation of a volume of a wellbore. However, embodiments including continuously transmitted weight data may use graphical and numerical displays incorporating continuous weight increments updated in real-time or near real-time. Such continuously updated displays may allow an operator to react to changes in drilling conditions more rapidly, thereby providing a more efficient drilling operation.

Those of ordinary skill in the art will appreciate that a number of different measurement cycles and display options may be used and adjusted according to the needs of a specific drilling operation. For example, in certain embodiments, PLC 113 may interface directly with a rig management system. In such an embodiment, as a rate of penetration or a drilling parameter of the drilling operation is adjusted, the data input into PLC 113 is also adjusted. Thus, the time between measurement cycles may be adjusted according to data received from such a rig management system. Additionally, data collected and analyzed by PLC 113 may be supplied to such a rig management system for further calculation of optimal drilling parameters. In an embodiment wherein the rig management system is integrally linked to PLC 113, the calculation of drill solids volume may be processed as a function of the rig management system. Thus, the rig management system may use the data collected by PLC 113 to suggest or provide recommended drilling parameter adjustments to optimize the drilling operation. As described above, certain drilling operations may farther benefit from the present disclosure if measurements are recorded continuously so as to provide a real-time or near real-time assessment of downhole conditions. In such embodiments, as a measured volume of drill solids deviates substantially from a predicted volume of drill solids, either PLC 113 or the rig management system may inform a drilling operator of the change in conditions so that drilling parameters may be adjusted accordingly. One of ordinary skill in the art will appreciate that systems that obtain, display, and transmit data either internally using a PLC 113 or externally using alternative rig management systems may still provide real-time or near real-time data, thereby allowing a drilling operator to adjust drilling parameters to improve drilling. Thus, systems disclosed herein allow for the monitoring of the hole cleaning efficiency of a drilling operation. Moreover, because the hole cleaning monitoring occurs in real-time or near real-time, the results of such data acquisition may be used to further enhance the efficiency of the drilling operation by, for example, promoting increased cleaning efficiency, decreasing the likelihood of stick-slip situations, and decreasing circulation time of well fluids.

Those of ordinary skill in the art will appreciate that in certain embodiments, pneumatic transfer device 100 may include any type of pneumatic transfer device 100 known in the art, such as, for example, vacuum systems and ISO-vessels. Referring to FIGS. 1B-1D, a system of the present disclosure wherein a pneumatic transfer device 120 is an ISO-vessel is shown. One type of ISO-vessel that may be used in embodiments disclosed herein includes an ISO-PUMP™, commercially available from M-I LLC, Houston, Tex., and illustrated in FIGS. 1B-1D. In such an embodiment, pneumatic transfer device 120 may be enclosed within a support structure 117. Support structure 117 may enclose pneumatic transfer device 120 to protect and/or allow the transfer of the device from, for example, a supply boat to an offshore rig. Generally, pneumatic transfer device 120 includes a pressure vessel 102 having a lower angled section 118 to facilitate the flow of cuttings between pneumatic transfer device 120 and other processing and/or transfer equipment (not shown). A further description of pneumatic transfer devices 120 that may be used with embodiments of the present disclosure are discussed in U.S. Pat. No. 7,033,124, previously incorporated by reference. Those of ordinary skill in the art will appreciate that alternate geometries of pneumatic transfer devices 120, including those with lower sections that are not conical, may be used in certain embodiments of the present disclosure.

Referring specifically to FIG. 1C, pneumatic transfer device 120 includes additional support members 119 disposed on weight sensors 111, such that, as pneumatic transfer device 120 is filled with cuttings, a weight of the cuttings may be obtained. In one embodiment, weight sensors 111 may include strain gauges disposed proximate pneumatic transfer device 120. Examples of strain gauges that may be used with embodiments disclosed herein include gauges that measure deformation of an object, and may include, for example a metallic foil pattern that deforms as the weight of pneumatic transfer device 120 increases as cuttings are added therein. As the metallic foil deforms, the electrical resistance of the foil changes, and the resistance may be measured by, for example, an operatively coupled PLC, or other calculation device. Thus, in an embodiment using strain gauge weight sensors 111, the weight sensors may actually be used to calculate a strain applied thereto, and a calculation device, such as an operatively coupled PLC may determine a weight of pneumatic transfer device 120. Those of ordinary skill in the art will appreciate that such weight sensors 111 may be operatively connected to PLCs (not shown), as described above, to process the data collected by weight sensors 111 to calculate, for example, a volume of drill cuttings in pneumatic transfer device 120.

In an alternate embodiment, illustrated specifically in FIG. 1D, weight sensors 111 may be disposed on a skid 109, such that, as pneumatic transfer device 120 is filled with cuttings, support structure 117 may contact and apply a force to weight sensors 111, and a weight of the cuttings in pneumatic transfer device 120 may be determined. Those of ordinary skill in the art will appreciate that the location of weight sensors 111 relative to pneumatic transfer device 120 and/or support structures 119 or 117 may vary, such that a weight of cuttings transferred into a component of pneumatic transfer device 120 is determinable Thus, in one embodiment using an ISO-vessel, as illustrated in FIG. 1D, drill cuttings may be transferred to pressure vessel 120 (i.e., the pneumatic transfer device 120) from a receiving vessel (not shown). Examples of alternate receiving vessels may include, for example, hoppers, storage bins, other pressure vessels, and/or other pneumatic transfer devices (e.g., other ISO-vessels). In operation, cuttings may be transferred into pneumatic transfer device 120, and a weight measurement may be determined at any point during which pneumatic transfer device 120 is being filled. In such an embodiment, no valve system is necessary, because the weight of pneumatic transfer device 120 is isolated from the rest of the system. However, a valve system may still be used to control, for example, the flow of cuttings into or out of the pneumatic transfer device 120. In one aspect of such an embodiment, strain gauge weight sensors 111 may be disposed may be disposed proximate pneumatic transfer device 120, to measure a strain and subsequently determine a weight of cuttings in pneumatic transfer device 120. Those of ordinary skill in the art will appreciate that the location of strain gauge weight cells 111 may vary according to they type of weight cells 111 used, and the requirements of the system. Those of ordinary skill in the art will further appreciate that in the above described embodiment, because the system does not require valve cycling, a PLC (not shown) may continuously measure the weight of cuttings in pneumatic transfer device 120. In another aspect, the weight of the cuttings may be incrementally determined as cuttings are transferred into pneumatic transfer device 120, as previously described.

In operation, multiple pneumatic transfer devices 100 and 120 may be used in combination when transferring and/or storing cuttings. Thus, in some drilling operations, a rig may include a combination of pneumatic transfer devices 100 and 120 as illustrated in FIGS. 1A-1D. In such systems, pneumatic transfer devices 100 may be in fluid communication with pneumatic transfer device 120. For example, in certain drilling operations, a pneumatic transfer device 100 may receive cuttings from upstream processing equipment, then pneumatically transfer the cuttings to pneumatic transfer devices 120 for storage. In such an embodiment, one of ordinary skill in the art will appreciate that multiple measurements of cuttings weight may be obtained (e.g., a weight of the cuttings may be obtained in both pneumatic transfer devices 100 and 120). Multiple determinations of cuttings weight may be used to, for example, determine system integrity (i.e., to ensure that substantially all of the cuttings stay within the system). Multiple measurements may also be used to determine the weight of individual storage vessels (e.g., a single pneumatic transfer device 120), the volume of cuttings being offloaded in an operation, or may be used as a redundancy measure to ensure the accuracy of the system and/or the operability of system components (e.g., to ensure individual load cells 111 are functioning properly).

Figure 1E:
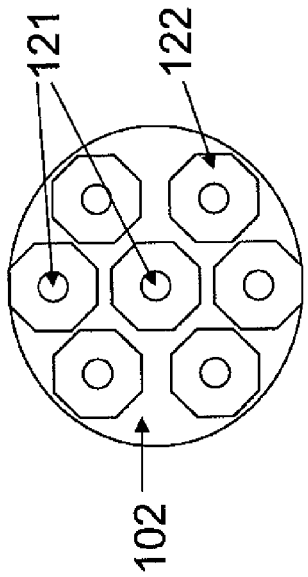
FIG. 1E shows a top view of a pressurized vessel according to one embodiment of the present disclosure.

Referring now to FIG. 1E, a top schematic view of a pressure vessel 102 according to one embodiment of the present disclosure is shown. In this embodiment, pressure vessel 102 has a circular external geometry and a plurality of outlets 121 for discharging drill solids therethrough. Additionally, pressure vessel 102 has a plurality of internal baffles for directing a flow of drill solids to a specific one of outlets 121. For example, as drill solids are transferred into pressure vessel 102, the drill solids may be divided into a plurality of discrete streams, such that a certain volume of drill solids are discharged through each of the plurality of outlets 121. Thus, pressure vessel 102 having a plurality of baffles 122, each corresponding to one of outlets 121, may increase the efficiency of discharging drill solids from pressure vessel 102.

During operation, drill solids transferred into pressure vessel 102 may exhibit plastic behavior and begin to coalesce. In traditional transfer vessels having a single outlet, the coalesced drill solids could block the outlet, thereby preventing the flow of solids therethrough. However, the present embodiment is configured such that even if a single outlet 121 becomes blocked by drill solids, the flow of solids out of pressure vessel 102 will not be completely inhibited. Moreover, baffles 122 are configured to help prevent drill solids from coalescing. As the drill solids flow down through pressure vessel 102, the drill solids will contact baffles 122, and divide into discrete streams. Thus, the baffles that divide drill solids into multiple discrete steams may further prevent the drill solids from coalescing and blocking one or more of outlets 121.

Figure 1F:
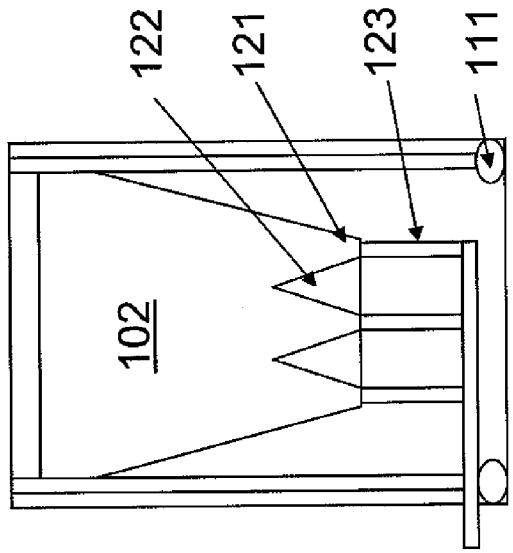
FIG. 1F shows a cross section of a pneumatic transfer device according to one embodiment of the present disclosure.

Referring to FIG. 1F, a cross-sectional view of pressure vessel 102 from FIG. 1E according to one embodiment of the present disclosure is shown. In this embodiment, pressure vessel 102 is illustrated including a plurality of outlets 121 and a plurality of internal baffles for directing a flow of drill solids through pressure vessel 102. In this embodiment, each of the outlets 121 are configured to flow into a discharge line 123. Thus, as drill solids flow through pressure vessel 102, they may contact one or more of baffles 122, divide into discrete streams, and then exit through a specific outlet 121 corresponding to one or more of baffles 122. Such an embodiment may allow for a more efficient transfer of drill solids through pressure vessel 102.

Those of ordinary skill in the art will appreciate that one or more valves (not illustrated) may be disposed along discharge line 123 or outlet 121 for controlling the flow of drill solids. Additionally, one or more PLCs or sensors may also be disposed along discharge line 123 or outlet 121 for providing data or controlling the operation of pressure vessel 102. For example, in one embodiment, one or more sensors (e.g., conductivity or flow rate sensors) may be included such that a flow rate of drill solids through pressure vessel 102, discharge line 123, or along a specific outlet 121 may be determined. The determination of such flow rates may provide information to a drilling engineer indicating that an outlet 121 has become blocked by coalesced drill solids. For example, if the flow rate of drill solids through one outlet 121 is lower than a flow rate through one or more of the other outlets, a condition indicating a blocked outlet 121 may be determined. Similarly, if the flow rate of drill solids through one outlet 121 is lower than an expected flow rate a condition indicating a blocked outlet 121 may also be determined. Upon determination of a blocked outlet, a drilling engineer may decide whether to adjust the transfer operation in view of the blocked outlet, or continue the transfer of drill solids.

Those of ordinary skill in the art will appreciate that because a volume of drill solids may be determined using, for example, weight sensors 111, as described above, a determination of whether an outlet is blocked may be made. For example, if one or more of outlets 121 become clogged, drill solids might become backed-up in pressure vessel 102, thereby distorting the volume calculation of transferred drill solids. To overcome such miscalculation of drill solids volume, a PLC or a drilling engineer may tare weight sensors 111 between measurements to ensure that any residual drill solids remaining in pressure vessel 102 are not included in the volume calculation.

Figure 1G:
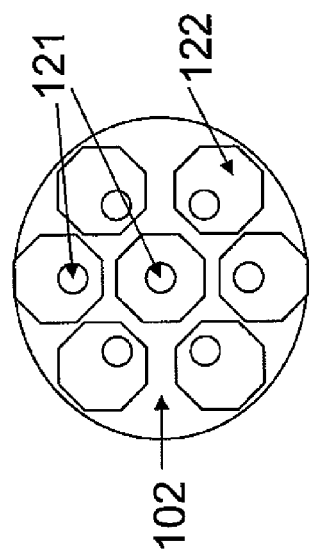
FIG. 1G shows a top view of a pressurized vessel according to one embodiment of the present disclosure.

Referring now to FIG. 1G, a top schematic view of a pressure vessel 102 according to one embodiment of the present disclosure is shown. In this embodiment, pressure vessel 102 has a circular external geometry and a plurality of outlets 121 for discharging drill solids therethrough. Additionally, pressure vessel 102 has a plurality of internal baffles for directing a flow of drill solids to a specific one of outlets 121. For example, as drill solids are transferred into pressure vessel 102, the drill solids may be divided into a plurality of discrete streams, such that a certain volume of drill solids are discharged through each of the plurality of outlets 121. Pressure vessel 102 having a plurality of baffles 122, each corresponding to one of outlets 121, may be useful discharging drill solids from pressure vessel 102.

Figure 1H:
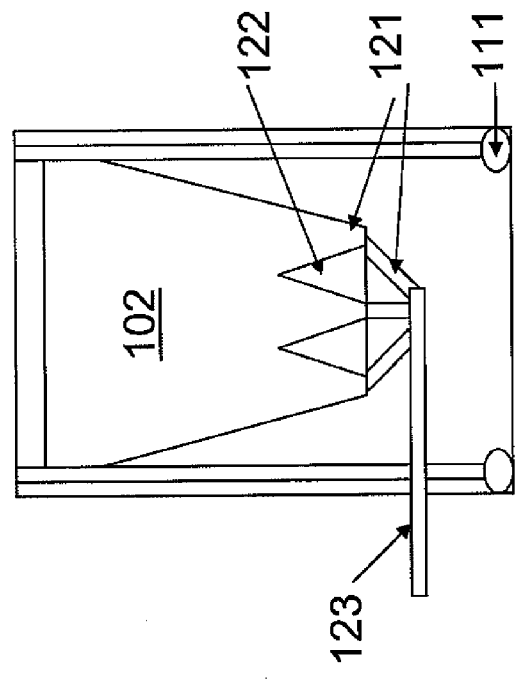
FIG. 1H shows a cross section of a pneumatic transfer device according to one embodiment of the present disclosure.

Referring to FIG. 1H, a cross-sectional view of pressure vessel 102 from FIG. 1G according to one embodiment of the present disclosure is shown. In this embodiment, pressure vessel 102 is illustrated including a plurality of outlets 121 and a plurality of internal baffles for directing a flow of drill solids through pressure vessel 102. In this embodiment, each of the outlets 121 are configured to flow discretely into a discharge line 123. Thus, as drill solids flow through pressure vessel 102, they may contact one or more of baffles 122, divide into discrete streams, and then exit through a specific outlet 121 corresponding to one or more of baffles 122. Such an embodiment may allow for a more efficient transfer of drill solids through pressure vessel 102.

Because outlets 121 do not combine prior to joining with discharge line 123, the blocking of one or more of outlets 121 due to coalesced drill solids may be further reduced. Those of ordinary skill in the art will appreciate that the specific configuration of baffles 121 and outlets 121 may vary without departing from the scope of the present disclosure. For example, in one embodiment, a pressure vessel 102 having two outlets 121 and a single baffle 122 may be used, whereas in other embodiments a pressure vessel 102 having three or more outlets 121 and baffles 122 may be used. Additionally, the number of baffles 122 and/or discrete stream created within pressure vessel 102 may be different from the number of outlets 121. For example, in one embodiment, pressure vessel 102 may include three baffles 122 corresponding to two outlets 121. In other embodiments, the number of outlets 121 may be greater than the number of baffles 122.

Moreover, those of ordinary skill in the art will appreciate that the geometry of baffles 122 may vary according to the design requirements of a given pressure vessel 102. In one aspects, baffles 122 may be configured in a triangular geometry, while in other embodiments, baffles 122 may be substantially cylindrical, conical, frustoconical, pyramidal, polygonal, or of irregular geometry. Furthermore, the arrangement of baffles 122 in pressure vessel 102 may also vary. For example, baffles 122 may be arranged concentrically around a center point of the pressure vessel 102, or may be arbitrarily disposed within pressure vessel 102. Moreover, in certain embodiments, the disposition of baffles 122 may be in a honeycomb arrangement, to further enhance the flow of drill solids therethrough.

Those of ordinary skill in the art will appreciate that the precise configuration of baffles 122 within pressure vessel 102 may vary according to the requirements of a transfer operation. As the geometry of baffles 122 is varied, the geometry of outlets 121 corresponding to baffles 122 may also be varied. For example, as illustrated in FIGS. 1E-1H, outlets 121 have a generally conical geometry. In other embodiments, outlets 121 may have frustoconical, polygonal, cylindrical, or other geometry that allows outlet 121 to correspond to a flow of drill solids in pressure vessel 102.

Figure 2:
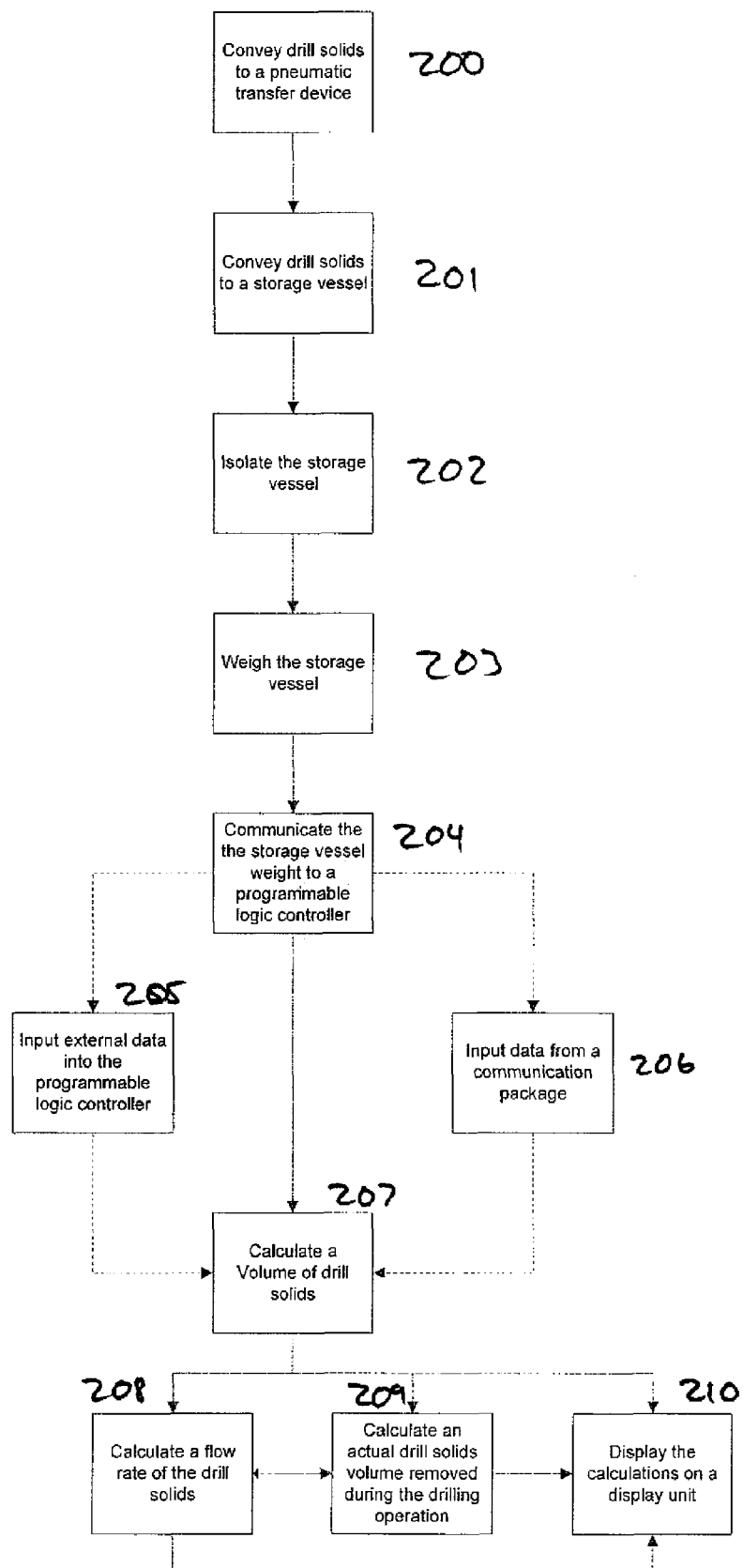
FIG. 2 shows a block flow diagram of a method according to one embodiment of the present disclosure.

Referring now to FIG. 2, a block flow diagram of a method according to one embodiment of the present disclosure is shown. In such an embodiment, drill solids are conveyed from a cleaning process (e.g., a vibratory separator), whereby well fluids are separated from drill solids, into a pneumatic transfer device 200. In one embodiment, the pneumatic transfer device may include a CLEANCUT™ CUTTINGS BLOWER (CCB), commercially available from M-I LLC, in Houston, Tex. In other embodiments, pneumatic transfer device 200 may include, for example ISO-vessels or other cuttings storage vessels, as described above.

In a system using a pneumatic transfer device, drill solids are conveyed into the pneumatic transfer device 200, then as a measurement of drill solids is required/requested, a first valve in the pneumatic transfer device isolates the receiving section of the pneumatic transfer device from the pressurized section of the pneumatic transfer device. In this embodiment, the pressurized section of the pneumatic transfer device (102 of FIG. 1A) will be referred to generally as a storage vessel. After isolating the storage vessel via actuation of a first valve, as described above, thereby preventing further conveyance of drill solids, a second valve closes off the storage vessel 202, and weight sensors obtain a weight of the storage vessel 203. The raw data collected by the weight sensors will include the weight of the drill solids and the weight of the storage vessel, however, one of ordinary skill in the art will appreciate that the system may be tared to incorporate the weight of the storage vessel so that the weight of the drill solids contained therein is calculable.

After obtaining the weight of the storage vessel and/or the weight of the drill solids alone, the data is communicated to a PLC 204 via a data line, as described above. Before a volume of drill solids may be calculated from the weight data, the imputation of either external data 205 derived on location, or the imputation of data remotely via an associated communication package 206 may be necessary. Such inputted data may include the density of the well fluids, the net density of the returned drilling fluid, and the density of the cuttings. With such measured and acquired data, a volume of drilling solids may be calculated.

One such method of calculating the volume of drill solids removed during the drilling operation includes taking the weight of drill solids determined by the weight sensors at 203 and calculating a volume of drill solids by adjusting the obtained weight for densities and fluid-to-solids ratios obtained from standard drilling fluid checks and retort analysis. One of ordinary skill in the art will appreciate that that in a typical retort analysis, a sample of uncleaned drilling solids with well fluids entrained therein is collected and heated such that the volumes of water and oil driven off are measured and recorded. Typically, the sample of drill solids is then crushed and weighted before being placed in the retort. The sample is then heated, usually in stages, during which the fluids are vaporized, collected, condensed, and then separated. From such analysis, the volume percent water, oil and retort solids is obtained. Furthermore, the density of drill solids may be obtained, so that in combination with the measured drill solids weight, a volume of drill solids may be calculated using the formula Volume=Weight/Density.

Additional external data may be input into the PLC at 205 including data obtained from gamma densimeter, coriolis, and/or cation exchange capacity tests, commonly used to measure mud densities and solids content in a drilling fluid. Furthermore, inputted data may be received by a communication package 206 to further condition the weight data obtained by the weight sensors to more accurately calculate a volume of drill cuttings removed during the drilling operation.

After such data is input into the PLC 205 at 205 and 206, a volume of drill solids is calculated at 207. This volume may be directly displayed at 210 in pro rata form, such that only the volume in the storage vessel when the calculation occurs is displayed, or the volume may be summed with previously acquired measurements to determine a net volume of drill solids removed by a drilling operation 209. Furthermore, such data may be combined with time measurement data and known formation property data to determine a flow rate of drill solids from the wellbore to the pneumatic transfer device 208. The calculation and display of drill solids volume and flow rates are merely exemplary of the type of data that may be determined using embodiments of the present disclosure. The calculation of other drilling properties may be possible, as explained in U.S. Pat. No. 6,410,862, hereby incorporated by reference herein.

In certain embodiments, the results of previous drilling operations may be saved, the data of which may then be superimposed over the data of a current drilling operation so that the cleaning efficiency of the current drilling operation is understood in a historical perspective. Such data sets may be displayed numerically, graphically, or in comparative form, as discussed above. Thus, in one embodiment, the calculations of a measured volume of drill solids may be compared relative to a predicted volume of drill solids, and the comparison may then be compared against a historical run to analyze the efficiency of the hole cleaning. Furthermore, because the data may be saved as historical data, the cleaning operations of a current drilling operation compared to data collected from, for example, an offset well may further provide data useful in increasing hole cleaning.

Embodiments of the present disclosure may be used in a drilling operation to determine a hole cleaning efficiency model based on calculating the volume of drill solids removed from the wellbore. In such an embodiment, a drilling operator drills a wellbore with a drilling fluid and then returns the drilling fluid to the surface. The returned drilling fluid is then separated into a fluid portion, which is typically recycled in the drilling operation, and a solid portion, which is typically disposed of according to local environmental regulations. After separating the reusable fluid from the solid portion, a volume of the solid portion is calculated. One method of calculating the volume of the solid portion is using the system described above. In such a system, weight sensors may determine the weight of the solid portion, and a PLC may use the weight to calculate a volume of the solid portion. After calculating the volume of the solid portion, a hole cleaning efficiency may be determined by comparing the measured volume of the solid portion from an expected volume of solid portion. In this embodiment, the hole cleaning efficiency may then be used by the drilling operator to determine which, if any, of the drilling parameters to adjust. Examples of drilling parameters that may be adjusted include, for example, the revolutions per minute of the drill bit, the weight on bit, the properties of the drilling fluid, the flow rate of drilling fluid etc.

Thus, for example, in a drilling operation wherein the measured volume of the solid portion is less than the predicted volume of the solid portion by a preselected margin indicative or poor hole cleaning, a drilling operator may be informed. The drilling operator may then take remedial steps to increase the efficiency of the hole cleaning. For example, the drilling operator my decease the density of the drilling fluid, increase the viscosity of the drilling fluid, or increase the flow of drilling fluid into the wellbore to stimulate increased solids removal. In certain embodiments, the hole cleaning efficiency may be communicated to the drilling operator on a display of a transfer device, or in other embodiments, the hole cleaning efficiency may be directly communicated to a rig management system, as described above.

In other embodiments, systems of the present disclosure may be used to determine wellbore stability, create wellbore models, and otherwise determine downhole conditions of a wellbore during, for example, drilling, completion, production, post-production, and/or cuttings re-injection operations. Thus, because embodiments disclosed herein determine a solids content present in a fluid returned to the surface of a wellbore, the volume of solids recovered may help a drilling operator determine the stability of a wellbore. Such wellbore stability models may be used to predict and/or determine, inter alia, formation stability, whether the wellbore is collapsing, and/or other conditions of a wellbore. Furthermore, because a solids content may be measured in real-time or near real-time, such wellbore stability issues may be remedied before the wellbore collapses, thereby allowing a drilling operator to take steps to prevent wellbore collapse. Thus, by helping to determine wellbore stability issues, embodiments disclosed herein may prevent costly wellbore recovery and remediation operations, thereby making such operations more cost efficient.

Advantageously, embodiments of the present disclosure may provide for the real-time or near real-time monitoring of downhole conditions based on the calculation of drill solids removed during the drilling operation. Because such calculations occur in close proximity to the return of the drill solids from downhole, the data may be processed by the system, or otherwise used by alternate rig management systems to determine the condition of a wellbore and the wellbore cleaning efficiency of the drilling operation. Furthermore, use of such monitoring apparatus in a pneumatic transfer system may allow for substantially all of the drill solids removed during the drilling operation to be accounted weighed and recorded. Because substantially all of the drills solids removed may be accounted for, an accurate calculation of drill solid volume may be measured, and such calculations may be used to determine downhole conditions.

Because the data discussed above may be collected in real-time or near real-time the data may be used by a drilling operator or by a rig management system to adjust drilling parameters to promote more efficient drilling operations. Finally, the real-time or near real-time determinations of wellbore cleaning efficiency may help inform a drilling operator of the onset of poor hole cleaning that may result in additional tripping of the drill string, longer bottom circulation times, increased wellbore instability, differential sticking, and extended drilling times. By providing a drilling operator with the data discussed above in real-time or near real-time, the drilling operator may take steps to increase hole cleaning efficiency thereby resulting in increased drilling efficiency.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system for determining produced drill solids volume comprising:
 a receiving vessel for receiving drill solids;
 a pressure vessel coupled to the receiving vessel;
 an isolation valve system disposed between the receiving vessel and the pressure vessel, the isolation valve system comprising a first valve configured to control a flow of drill solids from the receiving vessel and a second valve configured to pressurize the pressure vessel;
 wherein spacing provided between the first valve and the second valve is configured to prevent a weight of the drill solids in the receiving vessel from imparting a weight to the pressure vessel;
 a skid comprising a plurality of weight sensors for weighing the drill solids in the pressure vessel, wherein the pressure vessel is disposed on the plurality of weight sensors; and
 a programmable logic controller operatively coupled to at least the plurality of weight sensors for calculating the weight of the drill solids in the pressure vessel.

2. The system of claim 1, further comprising:
 a display unit operatively coupled to the programmable logic controller for displaying at least a calculated drill solids volume in the pressure vessel.

3. The system of claim 2, wherein the display unit comprises an input function for inputting external data.

4. The system of claim 1, wherein the programmable logic controller provides an output signal comprising at least a calculated drill solids volume.

5. The system of claim 1, further comprising:
 a communication package operatively linked to a drilling system, wherein the communication package is configured provide data from a drilling operation to the programmable logic controller.

6. The system of claim 1, wherein the programmable logic controller controls a discharge cycle interval of the pressure vessel.

7. The system of claim 6, wherein the discharge cycle interval is defined by a rate of penetration of a drilling operation.

8. The system of claim 6, wherein the discharge cycle interval is defined by a calculated weight of the drill solids.

9. The system of claim 1, wherein the programmable logic controller calculates a flow rate of drill solids.

10. The system of claim 1, wherein the weight sensors are selected from a group consisting of load cells and strain gauges.

11. The system of claim 1, wherein the pressure vessel comprises a plurality of internal baffles.

12. A method of determining produced drill solids volume comprising:
 conveying drill solids to a storage vessel, wherein the storage vessel is disposed on a skid comprising a plurality of weight sensors, and wherein the plurality of weight sensors are operatively coupled to a programmable logic controller;
 isolating between the storage vessel and a receiving vessel with a first valve and a second valve, thereby preventing drill solids in the receiving vessel from imparting a weight to the storage vessel;
 weighing the storage vessel and the drill solids with the plurality of weight sensors;
 communicating a measurement of the weight of the storage vessel and the drill solids from the weight sensors to the programmable logic controller; and
 calculating a volume of drill solids in the storage vessel.

13. The method of claim 12, further comprising:
 inputting an external data to the programmable logic controller.

14. The method of claim 13, wherein the external data comprises at least a result of a retort analysis.

15. The method of claim 13, wherein the inputting comprises communicating the external data from a drilling operation to the programmable logic controller.

16. The method of claim 12, further comprising:
calculating an actual drill solids volume removed during a drilling operation.

17. The method of claim 12, further comprising:
calculating a flow rate of drill solids.

18. The method of claim 12, wherein the storage vessel comprises a pressure vessel.

19. The method of claim 12, further comprising:
weighing the discharged drill solids at a plurality of points along a discharge line.

20. The method of claim 12, further comprising:
determining a hole cleaning efficiency based on the calculated volume of drill solids.

21. The method of claim 20, further comprising:
communicating the hole cleaning efficiency to a rig management system.

22. The method of claim 20, further comprising:
adjusting a drilling parameter based on the hole cleaning efficiency.

* * * * *